US012238197B2

(12) United States Patent
Wade (10) Patent No.: US 12,238,197 B2
(45) Date of Patent: Feb. 25, 2025

(54) UTILIZING HOMOMORPHIC PROPERTIES FOR IMAGE ENCRYPTION AND DECRYPTION

(71) Applicant: Howard University, Washington, DC (US)

(72) Inventor: Mamadou Ibra Wade, Berwyn Heights, MD (US)

(73) Assignee: HOWARD UNIVERSITY, Washington, DC (US)

( * ) Notice: Subject to any disclaimer, the term of this patent is extended or adjusted under 35 U.S.C. 154(b) by 344 days.

(21) Appl. No.: 17/057,950

(22) PCT Filed: May 24, 2019

(86) PCT No.: PCT/US2019/033948
§ 371 (c)(1),
(2) Date: Nov. 23, 2020

(87) PCT Pub. No.: WO2019/227009
PCT Pub. Date: Nov. 28, 2019

(65) Prior Publication Data
US 2021/0211269 A1 Jul. 8, 2021

Related U.S. Application Data

(60) Provisional application No. 62/675,797, filed on May 24, 2018.

(51) Int. Cl.
*H04L 9/00* (2022.01)
*H04L 9/30* (2006.01)
*H04L 9/14* (2006.01)

(52) U.S. Cl.
CPC ............ *H04L 9/008* (2013.01); *H04L 9/3006* (2013.01); *H04L 9/14* (2013.01); *H04L 2209/12* (2013.01)

(58) Field of Classification Search
CPC ........ H04L 9/008; H04L 9/14; H04L 2209/12
See application file for complete search history.

(56) References Cited

U.S. PATENT DOCUMENTS

| 4,776,013 | A | 10/1988 | Kafri et al. |
| 5,983,251 | A | 11/1999 | Martens et al. |
| 6,466,209 | B1 | 10/2002 | Bantum |

(Continued)

FOREIGN PATENT DOCUMENTS

| CN | 106941402 A | * | 7/2017 | ........... G06F 21/602 |
| CN | 106952212 A | * | 7/2017 | ........... G06K 9/4642 |

OTHER PUBLICATIONS

Written Opinion for PCT/US2019/033948, dated Aug. 27, 2019.
International Search Report for PCT/US2019/033948, dated Aug. 27, 2019.

*Primary Examiner* — Ellen Tran
(74) *Attorney, Agent, or Firm* — Sughrue Mion, PLLC (57) ABSTRACT

Encryption of an image is achieved through application of a homomorphic encryption function to produce cipher images for each image. Encryption is performed individually on sub-values of a pixel's intensity value, wherein the pixel's intensity value can be described as a sum of the smaller numerical sub-values. The encrypted values for each sub-value form encrypted images that can be transferred or stored on insecure media. Separate encryption approaches can be applied to individual sets of the numerical sub-values to improve security.

32 Claims, 4 Drawing Sheets

(56) References Cited

U.S. PATENT DOCUMENTS

2010/0008505 A1  1/2010  Bai
2010/0169649 A1  7/2010  Haas et al.
2020/0136797 A1* 4/2020  Yu .......................... H04L 9/008

* cited by examiner

TYPE I RECEIVER: DIFFERENT KEY

FIG. 3B

TYPE II RECEIVER: DIFFERENT KEYS

FIG. 4

UTILIZING HOMOMORPHIC PROPERTIES FOR IMAGE ENCRYPTION AND DECRYPTION

RELATED APPLICATIONS

This application is a National Stage of International Application No. PCT/US2019/33948 filed May 24, 2019, claiming priority based on U.S. provisional patent application No. 62/675,797 filed May 24, 2018, the contents of which are incorporated by reference as though fully rewritten herein.

TECHNICAL FIELD

This invention relates generally to image encryption, and, more specifically, to a distributed homomorphic image encryption method.

BACKGROUND

Encrypted image security can be used to combat cyber attackers, who are becoming more sophisticated in their approaches to attack communication networks, computer systems, and information stored therein. Therefore, new encryption schemes that can efficiently protect information and counter any malicious cyber behavior are needed to increase the security of information in general, and, more particularly, the security of encrypted images.

SUMMARY

Generally speaking, pursuant to these various embodiments, an increased security homomorphic image encryption approach is presented. A homomorphic image encryption scheme can be used to encrypt images before transmitting them through unsecured channels without compromising their contents, as well as to protect them when they are stored in computer servers or other storage devices. After these images are processed and/or classified, they need to be protected against any unauthorized visualization, extraction of information, and/or alteration of their contents. As such, any images in this visible electromagnetic spectrum range can be processed by encryption and decryption algorithms, such images may include confidential images from satellites, military application images, industrial application images, family picture images, medical images, fingerprint images, and images from many more areas of applications where there is a need to protect from any security breach and ensure their confidentiality and integrity.

Homomorphic encryption/decryption algorithms can transform these plain images into encoded "cipher" images that can withstand a wide range of security attacks, including Histogram Analysis, Entropy Analysis, Correlation Analysis, Chosen-Plaintext Attacks, Brute Force Attacks, and others. In the approach described herein, the encryption includes determining a pixel intensity value for individual pixels of an original image comprising a number of pixels. The pixel intensity value is a sum of at least two pixel intensity sub-values. The encryption approach then applies an encryption function to each of the at least two pixel intensity sub-values, for the individual pixels, to create a set of encrypted pixel sub-values corresponding to each of the at least two pixel intensity sub-values for the individual pixels. This approach creates more than one encrypted image derived from the original image, and each encrypted image (each of which may be created using different keys) is needed to reconstitute the original image, thereby increasing the difficulty in breaking the encryption. These and other benefits may become clearer upon making a thorough review and study of the following detailed description.

BRIEF DESCRIPTION OF THE DRAWINGS

The above needs are at least partially met through provision of the distributed homomorphic image encryption and decryption described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments it will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
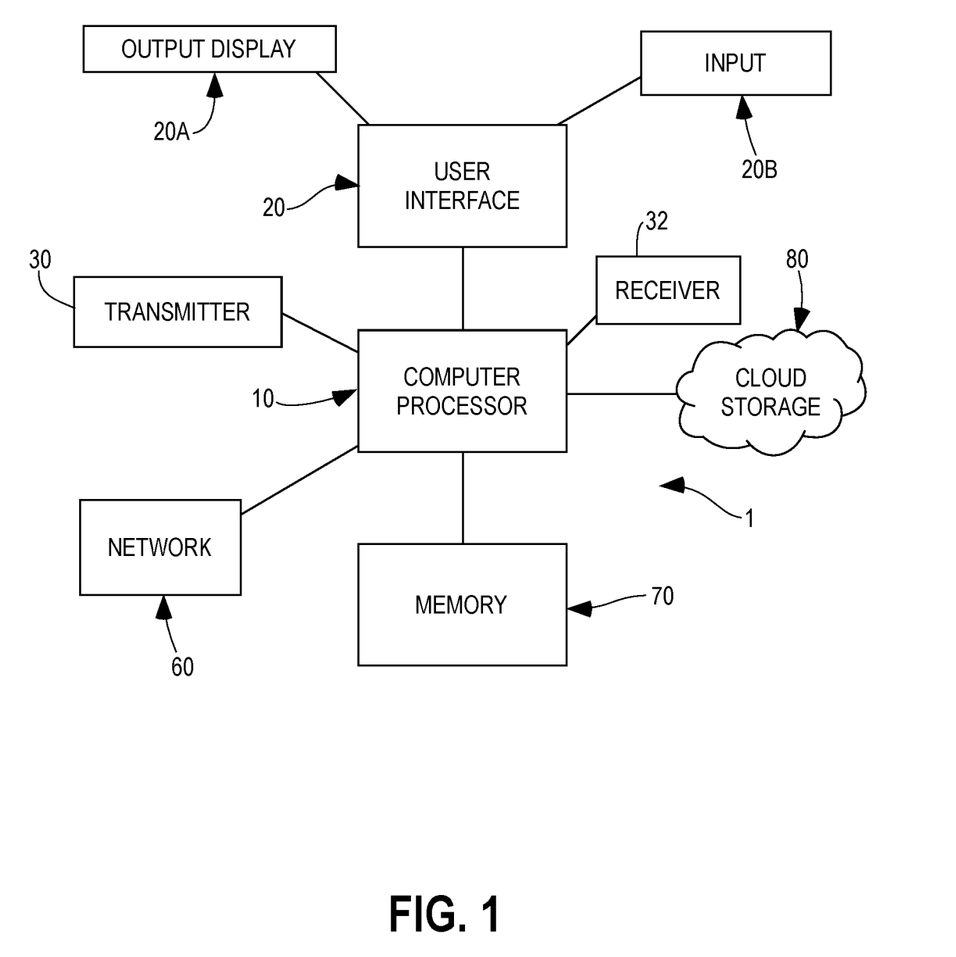
FIG. 1 comprises a block diagram of an example computing system configured to operate a homomorphic image encryption scheme in accordance with various embodiments of the invention.

Generally speaking, pursuant to these various embodiments, a method and apparatus for homomorphic image encryption and decryption is presented. Referring now to the drawings, and in particular to FIG. 1, a computing system 1 that can be used to implement the presently described homographic image encryption and decryption schemes is shown. The example computing system 1 includes a computer processor (CPU) 10, which interacts with a user interface 20. Those skilled in the art will recognize and appreciate that the CPU 10 may include one or more processors that can comprise a fixed-purpose hard-wired platform or can comprise a partially or wholly programmable platform. All of these architectural options are well known and understood in the art and require no further description here.

The user interface 20 can include an input device 20b and an output device, e.g., a display 20a. The display 20a can be, or can include, one or more of a monitor, printer, touch screen, audio device, or other computer-related devices that present output from the computing system 1. The input device 20b can be, or can include, one or more of a mouse, a touch screen, a keyboard, a microphone, a camera, a scanner, a touch pad, or other computer-related devices that allow a user to interact with a computer and provide feedback in essence, the user interface 20 allows a user to interact with the computing system 1 and provides relevant information to the user. In some embodiments, the input device 20b and the display 20a can be the same, or at least intertwined. For example, the user interface 20 can include a touch screen that provides both the function of the display 20a and the input device 20b.

The CPU 10 also includes and/or accesses a memory 70, which can be an electronic storage device. For example, the memory 70 can include a thumb drive, an SD card (or micro SD card), RAM memory, a hard drive, or other storage media, or a combination of such memory. The memory 70 can also be stored on the cloud 80 (data storage accessed through the internet), for example, and in some embodiments can include or be in communication with a network 60 or some other device that allows information stored on the memory 70 to communicate with the CPU 10, and the user interface 20. The CPU 10 may also be operably coupled to a transmitter 30 and/or a receiver 32.

Figure 2:
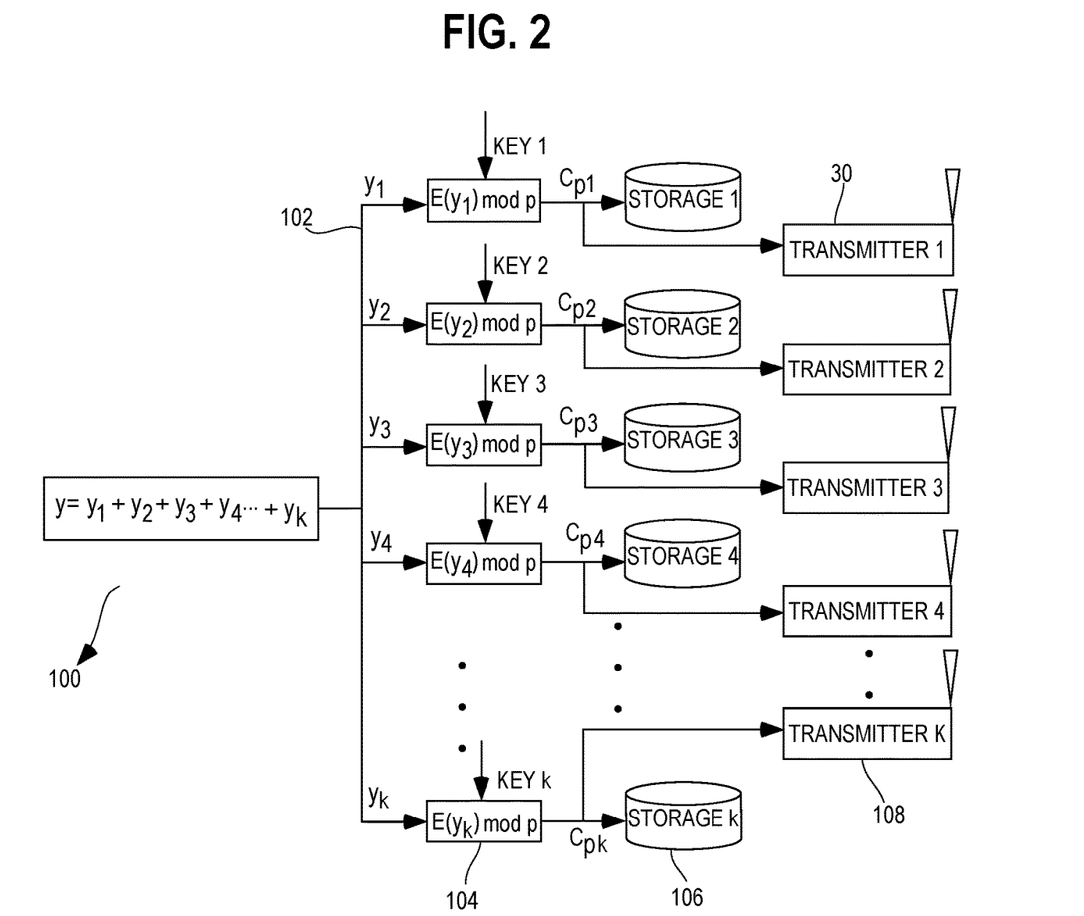
FIG. 2 comprises an example process flow diagram for an example processing apparatus configured to perform a homomorphic image encryption method in accordance with various embodiments of the invention.

Referring now to FIG. 2, an illustrative process that is compatible with many of these teachings will now be presented. Those skilled in the art will appreciate that the processes described are readily enabled using any of a wide variety of available and/or readily configured platforms, including partially or wholly programmable platforms as are known in the art or dedicated purpose platforms as may be desired for some applications. In general, a digital image is comprised of pixels distributed in a grid with rows and columns. A pixel will have a certain brightness, or "intensity", and each pixel intensity may be written as a sum of its components, or "sub-values". In one example, y is the intensity value of a pixel in an image g(i,j) for i=1, 2, 3, ... M and j=1, 2, 3, ... N, where the indices i and j represent individual pixels' coordinates and M and N are the number of rows and columns of pixels, respectively. The pixel intensity value), is found by, at step 100, summing k pixels' intensity sub-values, such that $y=y_1+y_2+y_3+\ldots y_k$. Furthermore, the number of sub-values, k, for each pixel is an integer between 0 and L (i.e., 0<k<L), and L is the number of intensity levels of a pixel.

Each sub-value is separated and sent at step 102 to a homomorphic encryption function, E, which is a mathematical function. The homomorphic encryption function at step 104 operates on the sub-values of each pixel, such that $E(y)=E(y_1+y_2+y_3+\ldots y_k)$, which may also be written in the form: $E(y)=E(y_1)\times E(y_2)\times E(y_3)\times \ldots E(y_k)$. One can perform distributed and/or parallel encryption processing of each $E(y_k)$ simultaneously, or at different times using the same or different encryption keys. Each $E(y_k)$ can also be computed by the same or different processors at the same or different locations. This can greatly increase the security of the encrypted image because an opponent may not have access to all $E(y_k)$ functions that may be stored at different locations or transmitted at different time intervals. Also, if different encryption keys are used for each $E(y_k)$, opponents who have access to some of the decryption keys may not have access to other decryption keys, resulting in an inability to decipher all of the encrypted component images without all the decryption keys. Also, each $y_k$ can be randomly generated; the only requirement in this context is that their sum should be equal to y, leading to an increase in diffusion of each plain-image's pixels. It is also noted that the larger the value of k, the more secure the encrypted image is, but also the higher the computational cost.

Figure 4:
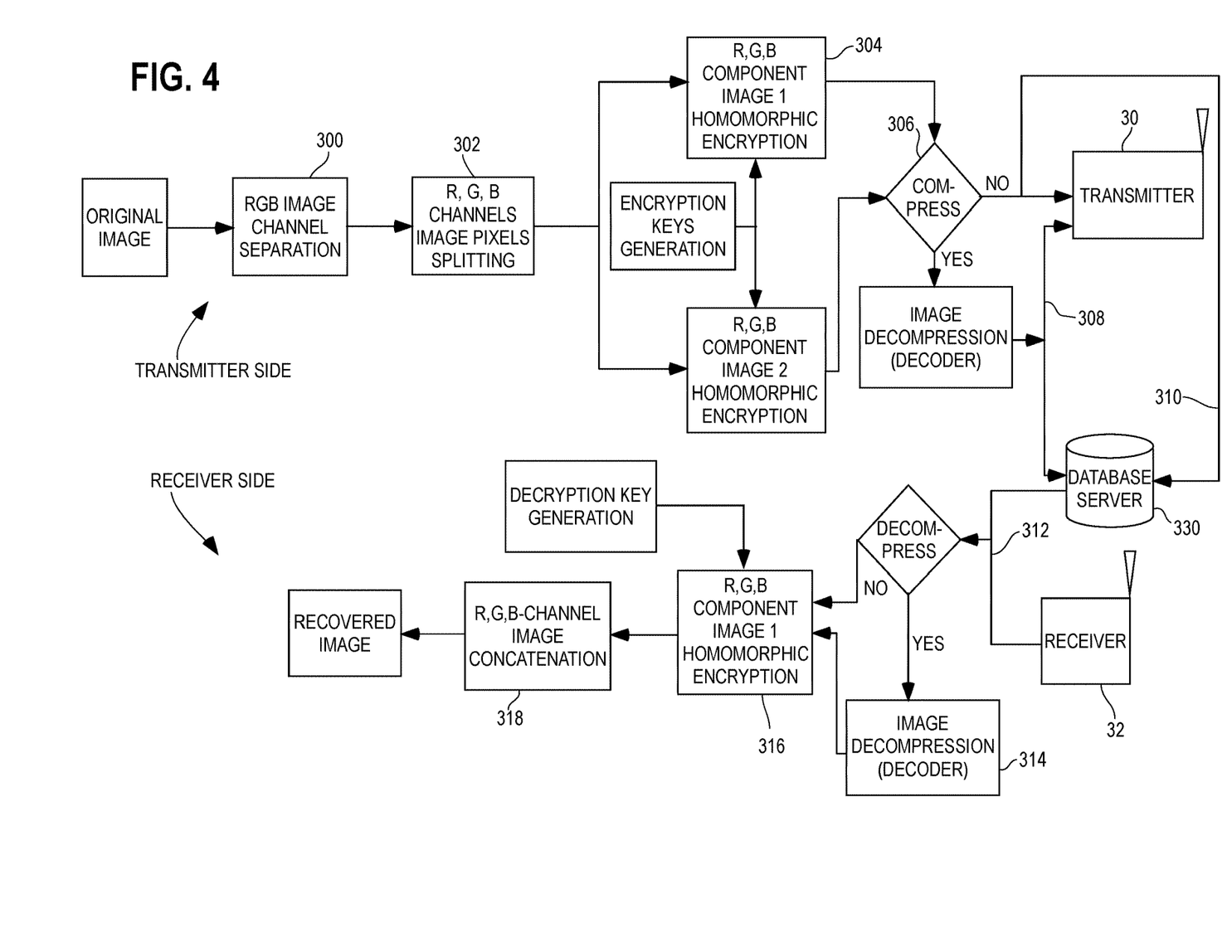
FIG. 4 comprises a flow diagram of an example homomorphic image encryption/decryption method in accordance with various embodiments of the invention.

In addition, each of the encrypted values $E(y_k)$ could be a very large integer, out of the range [0; (L−1)] of the associated image's pixels intensity values. Thus, to make these $E(y_k)$ meaningful from an image point of view, one can apply (mod p), where "mod" is the modulus p (with p being a prime number), to each of the encrypted values $E(y_k)$ to obtain pixels' intensity values within the range [0; (L−1)], that are meaningful from an image point of view (e.g., all pixels intensity values that are not out of the range [0,255] for an 8-bit image). For instance, this range is [0; 255] for the case of an 8-bit image, and p can be chosen to be p=257, the closest prime number to the range size. In this example, $C_1=E(y_1), C_2=E(y_2), C_3=E(y_3), \ldots C_k=E(y_k)$, where each $C_k$ is an encrypted value for the corresponding pixel intensity sub-value y. Applying (mod p), the encrypted values for each of the pixel's intensity sub-values $y_1, y_2, y_3, \ldots y_{pk}$ are given as the quantities $C_{p1}=E(y_1)$ mod p, $C_{p2}=(y_2)$ mod p, ... $C_{pk}=E(y_k)$ mod p. The encrypted values $C_{p1}, C_{p2}, \ldots C_{pk}$ are stored 106 in a storage device and/or transmitted 108 to a receiver or database 330. For instance, the encrypted values can be stored/saved in local or remote storage devices, and the encrypted values can be transmitted to a remote location through a transmitting antenna (e.g., transmitter 30) or through the internet or other communication channels which may be unsecured (FIG. 4).

Figure 3A:
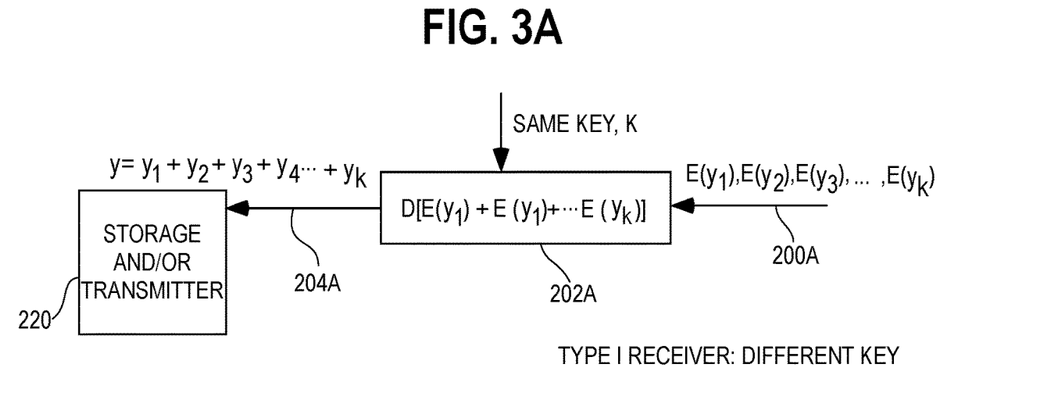
FIG. 3A comprises a flow diagram of an example homomorphic image decryption method in accordance with various embodiments of the invention.

With reference to FIG. 3A, a method for homomorphic image decryption is shown. In a manner analogous to the above-mentioned encryption function application, a transmitter transmits 200A the encrypted intensity sub-value $E(y_k)$ mod p. The decryption function, D, may be applied 202A with the same encryption key to recover the pixel intensity value y. Specifically, the decryption function D operates 202A to decrypt the encrypted pixel intensity value E(y), and the resultant decrypted pixel intensity sub-values needed to reconstruct the original image can be sent 204A to secure storage devices such as memory devices 70 and/or transmitter 30 through a secure channel for future usage. 320.

Figure 3B:
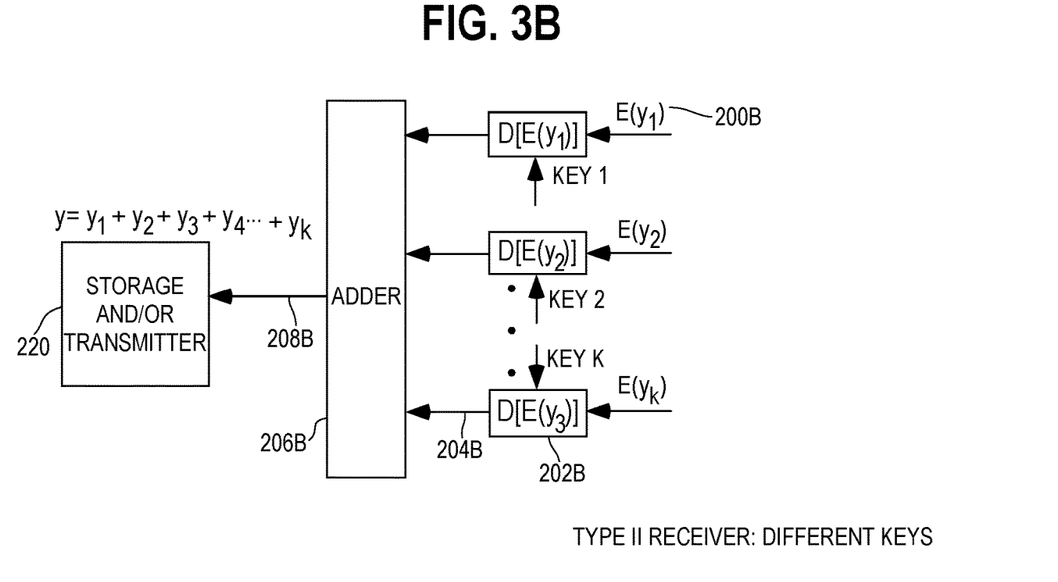
FIG. 3B comprises a flow diagram of an example homomorphic image decryption method in accordance with various embodiments of the invention.

In an alternative example shown in FIG. 3B, a transmitter transmits 200B each $E(y_k)$ to a receiving device, similar to the device depicted in FIG. 1, that is configured to have the decryption function D operate 202B into the individual pixels intensity sub-values $y_k$ with different encryption keys, which in turn, are transmitted 204B to an adder device to be summed 206B to obtain the pixel intensity y. Mathematically this may be written as $D[E(y)]=D[E(y_1)\times E(y_2)\times E(y_3)\times \ldots E(y_k)]=y_1+y_2+y_3+\ldots y_k=y$ for the case of FIG. 3A. All the pixel intensity value y needed to reconstruct the original image are then sent 208B to a secure storage device 70 and/or transmitter 30 through a secure channel if necessary for future usage.

One quantity used in the decryption is the greatest integer less than or equal to ($E(y_k)/p$), also known as the floor of ($E(y_k)/p$) or $\lfloor E(y_k)/p \rfloor$. This also represents the quotient ($qt_k$) when $E(y_k)$ is divided by p. In other words, mathematically, $qt_k=\lfloor E(y_k)/p \rfloor$. This quantity is not secret but can also be encrypted by other means to increase security because without it, reconstruction of $E(y_k)$ for decryption purposes at the receiver may be impossible. To reconstruct or compute the individual encrypted pixel intensity sub-values, the following equation is used for each value k: $E(y_k)=qt_k\times p+$ $C_{pk}$ where $qt_k \times p + C_{pk}$ is different for each k value. Once each $E(y_k)$ is found, the decryption function for the homomorphic encryption function E is applied to obtain the individual pixel sub-values y. In addition, if the encryption/decryption keys for each individual pixel intensity sub-value $y_k$ are different, one can first decrypt each $E(y_k)$, then add the sum of the pixel sub-values $y_1+y_2+y_3+\ldots+y_k$ to obtain the pixel intensity value y. For implementation efficiency, the image's pixel intensity values can be processed together as a matrix instead of single pixels.

In one example of the above described approach, a distributed homomorphic image encryption method for an instance where there are only two pixel intensity sub-values (k=2) is shown in FIG. 4. In this example, each pixel's intensity value y is written as a sum of only two pixel intensity sub-values $y_1$ and $y_2$, or $y=y_1+y_2$. The transmitter side of the flow diagram in FIG. 4 implements the concepts shown in FIG. 2, for the case of k=2, while the receiver side implements the decryption method of FIG. 3A, where the decryption keys are the same. In FIG. 4, the information source is an original image, which is an RGB image. The original image input is separated at step 300 into R, G, and B-channel images to produce three separate gray-scale images denoted by Original Image R, Original image G, and Original Image B. Then, the pixel intensity values y for each of these R, G, and B-Channel images are extracted and split 302 into two pixels components $y_1$ and $y_2$ so that $y=y_1+y_2$. Then $y_1$ and $y_2$ are each encrypted 304 separately using a homomorphic encryption function E and the same public key to produce two encrypted pixel sub-values $C_{p1}$ and $C_{p2}$ that can each optionally be compressed 306 using known compression methods before being transmitted 308 and/or stored.

In one more specific example, the encryption function for this can be represented as $E(y)=E(y_1)+E(y_2)$. The encryption function E has an homomorphic property in that the encryption of a sum of two pixel intensity sub-values $y_1$ and $y_2$ equals the product of the individual encrypted sub-values $E(y_1)$ and $E(y_2)$. One such function is the known Pailliers Cryptographic System where a value y can be encrypted as follows: $E(y)=g^y x^N \mod N^2$, where $N=s \times q$, and s and q are prime numbers, while x is a random number such that $x \in Z_N^*=\{1, 2, \ldots, (N-1)\}$, and g is an integer whose order l is a multiple of N such that $g^l \equiv 1 (\mod N)$ and a value of g=1+N satisfies this condition when s and q have the same length. When using the Paillier encryption scheme, N should be a large with, for example, more than 300 digits. In this example, $C_1=E(y_1)=g^{y_1} x_1^N \mod N^2$ and $C_2=E(y_2)=g^{y_2} x_2^N \mod N^2$. Applying mod p as described above gives $C_{p1}=E(y_1) \mod p=[g^{y_1} x_1^N \mod N^2] \mod p$ and $C_{p2}=E(y_2) \mod p=[g^{y_2} x_2^N \mod N^2] \mod p$ where $C_{p1}$ and $C_{p2}$ represent the cipher values corresponding to each of the pixel intensity sub-values $y_1$ and $y_2$ and are the values that are transmitter over or stored on insecure media.

For decryption in this example according to the decryption method described above, the encrypted pixel intensity sub-values $E(y_1)$ and $E(y_2)$ can be expressed as $E(y_1)=qt_1 \times p+C_{p1}$ and $E(y_2)=qt_2 \times p+C_{p2}$. The decryption proceeds as $D[E(y_1) \times E(y_2)]=D[y_1+y_2]=D[E(y)]=y$. When applying the Paillier Decryption function, $C=E(y_1) \times E(y_2)$ and $$y = \frac{L(C^\lambda \mod N^2)}{L(g^\lambda \mod N^2)}$$

mod N where $\lambda$ is given by the least common multiple of s−1 and q−1 while the function $$L(U) \text{ is } L(U) = \frac{(0-1)}{N}.$$

On the receiver side, the database 330 where the encrypted, compressed or uncompressed images are stored relays 312 the data to a receiver. The data (encrypted images) may also come through the receiver 32. The decompression is implemented 314 if necessary, and then the homomorphic property of the encryption function is also used to decrypt 316 previously encrypted pixels intensity sub-values and reconstruct each channel image before combining 318 them to recover the original RGB image. It is noted that after encrypting each channel Original Image R, G, or B, two cipher-images are produced instead of one. For instance, Original Image R will produce two encrypted images $R_1$ and $R_2$, Original image G will produce two encrypted images $G_1$ and $G_2$, while encrypted images $B_1$ and $B_2$ are obtained from encrypting Original Image B. Note that for implementation efficiency, matrices of corresponding pixels' intensity sub-values of the image of interest are processed simultaneously instead of individual pixel intensity sub-values.

Simulation results demonstrate that encryption using such an approach can resist security attaches under a variety of analyses including correlation analysis, information entropy, cipher cycle, histogram analysis, chosen-plaintext attacks, and brute force attacks. The described homomorphic image encryption scheme can be used in non real-time applications, such as archiving satellite images, some medical images, fingerprint images, or any confidential images in the visible electromagnetic spectrum range. Real-time applications may be possible with application of faster encryption and decryption algorithms.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of image encryption with homomorphic properties, the method comprising:
   determining with a processing device a pixel intensity value for respective individual pixel of an image comprising a number of pixels, wherein the pixel intensity value for the respective individual pixel is a sum of at least two pixel intensity sub-values for the respective individual pixel;
   separating with the processing device the at least two pixel intensity sub-values from the pixel intensity value for respective individual pixel; and
   applying with a processing device an encryption function to each of the at least two pixel intensity sub-values, for individual pixels, to create a set of encrypted pixel sub-values corresponding to each of the at least two pixel intensity sub-values for the individual pixels, wherein a sum of the set of encrypted pixel sub-values is equal to an encrypted pixel intensity value for the respective pixel, and the homomorphic properties are utilized for encryption and decryption of the image.

2. The method of claim 1 further comprising transmitting an encrypted image comprising the set of the encrypted pixel intensity sub-values corresponding to one of the at least two pixel intensity sub-values for the individual pixels.

3. The method of claim 1 further comprising transmitting encrypted images corresponding to the respective individual pixel of the at least two pixel intensity sub-values for the individual pixels, the encrypted images comprising the set of the encrypted pixel intensity sub-value corresponding to more than one of the at least two pixel intensity sub-values for the individual pixels.

4. The method of claim 3 wherein the transmitting the encrypted images comprises transmitting cipher images.

5. The method of claim 1 wherein the encryption function is homomorphic, and applying the encryption function comprises applying the encryption function to each of the at least two pixel intensity sub-values in parallel.

6. The method of claim 5 wherein the applying the homomorphic encryption function comprises applying identical encryption keys to each of the at least two pixel intensity sub-values for the individual pixels.

7. The method of claim 5 wherein the applying the homomorphic encryption function comprises applying different encryption keys to each of the at least two pixel intensity sub-values for the individual pixels.

8. The method of claim 1 further comprising applying with the processing device a homomorphic decryption function to respective encrypted pixel sub-values or to a product of encrypted pixel intensity sub-values for the individual pixels, wherein applying the homomorphic decryption function comprises applying the homomorphic decryption function to the respective encrypted pixel sub-values in parallel.

9. The method of claim 1 further comprising recovering with a homomorphic decryption function each individual pixel's intensity sub-values.

10. The method of claim 9 further comprising sending each individual pixel's intensity sub-values to an adder device.

11. The method of claim 10 further comprising adding by the adder device the intensity sub-values to recover the pixel intensity value for individual pixels.

12. The method of claim 1 wherein the image is an RGB image.

13. The method of claim 12 further comprising separating the RGB image into R, G, and B channel images to produce distinct gray-scale images.

14. The method of claim 13 further comprising splitting the pixel intensity values for each of the R, G, and B channel images into the at least two pixel intensity sub-values.

15. The method of claim 11 further comprising sending the at least two pixel intensity sub-values used to produce the encrypted sub-values to a database for storage.

16. The method of claim 15 further comprising the database relaying the pixel intensity sub-value to a receiver.

17. An apparatus for image encryption with homomorphic properties, the apparatus comprising:
a memory;
a processor device in communication with the memory and configured to:
determine a pixel intensity value for respective individual pixel of an image comprising a number of pixels, wherein the pixel intensity value for the respective individual pixel is a sum of at least two pixel intensity sub-values for the respective individual pixel;
separate with the processing device the at least two pixel intensity sub-values from the pixel intensity value for respective individual pixel; and
apply an encryption function to each of the at least two pixel intensity sub-values for individual pixels to create a set of encrypted pixel intensity sub-values corresponding to each of the at least two pixel intensity sub-values for the individual pixels, wherein a sum of the set of encrypted pixel sub-values is equal to an encrypted pixel intensity value for the respective pixel, and the homomorphic properties are utilized for encryption and decryption of the image.

18. The apparatus of claim 17 wherein the processor device is further configured to effect transmitting an encrypted image comprising the set of the encrypted pixel intensity sub-value corresponding to one of the at least two pixel intensity sub-values for the individual pixels.

19. The apparatus of claim 17 wherein the processor device is further configured to effect transmitting encrypted images corresponding to the respective individual pixel of the at least two pixel intensity sub-values for the individual pixels, the encrypted images comprising the set of the encrypted pixel intensity sub-value corresponding to more than one of the at least two pixel intensity sub-values for the individual pixels.

20. The apparatus of claim 19 wherein the transmitting the encrypted images comprises transmitter cipher images.

21. The apparatus of claim 17 wherein the encryption function is homomorphic, and applying the encryption function comprises applying the encryption function to each of the at least two pixel intensity sub-values in parallel.

22. The apparatus of claim 21 wherein the applying the homomorphic encryption function comprises applying identical encryption keys to each of the at least two pixel intensity sub-values for the individual pixels.

23. The apparatus of claim 21 wherein the applying the homomorphic encryption function comprises applying different encryption keys to each of the at least two pixel intensity sub-values for the individual pixels.

24. The apparatus of claim 17 wherein the processor device is further configured to apply a homomorphic decryption function to respective encrypted pixel intensity sub-values for the individual pixels, wherein applying the homomorphic decryption function comprises applying the homomorphic decryption function to the respective encrypted pixel sub-values in parallel.

25. The apparatus of claim 17 wherein the processor device is further configured to recover with the homomorphic decryption function each individual pixel's intensity sub-values.

26. The apparatus of claim 25 wherein the processor device is further configured to send each individual pixel's intensity sub-values to an adder device.

27. The apparatus of claim 26 wherein the processor device is further configured to effect adding by the adder device the intensity sub-values to recover the pixel intensity value for individual pixels.

28. The apparatus of claim 17 wherein the image is an RGB image.

29. The apparatus of claim 28 wherein the processor device is further configured to separate the RGB image into R, G, and B channel images to produce distinct gray-scale images.

30. The apparatus of claim 29 wherein the processor device is further configured to split the pixel intensity values for each of the R, G, and B channel images into the at least two pixel intensity sub-values.

31. The apparatus of claim 28 wherein the processor device is further configured to send the at least two pixel intensity sub-values to a database for storage.

32. The apparatus of claim 31 wherein the database is configured to relay the encrypted pixel intensity sub-value data to a receiver for a decryption process.

* * * * *